Dec. 22, 1953 P. F. SMITH 2,663,524
PARACHUTE FLAP
Filed Aug. 21, 1950
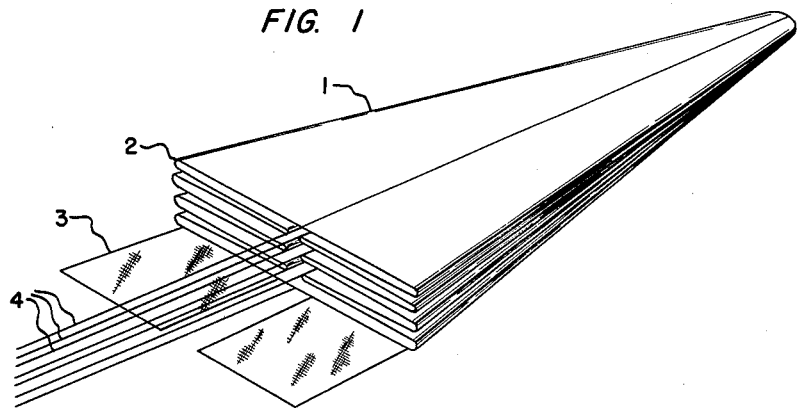
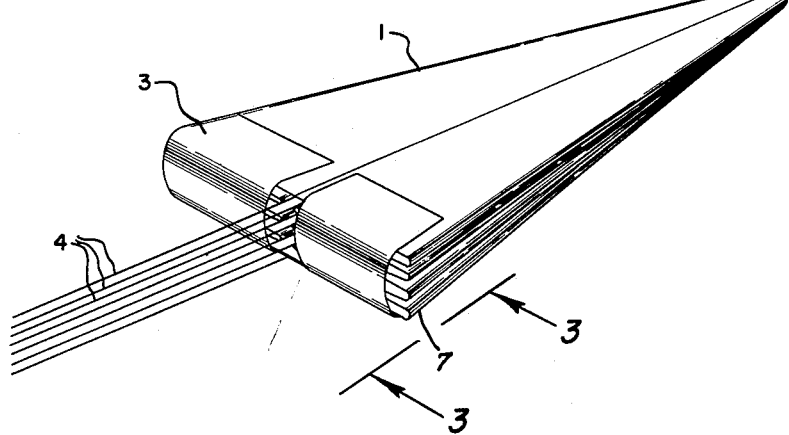
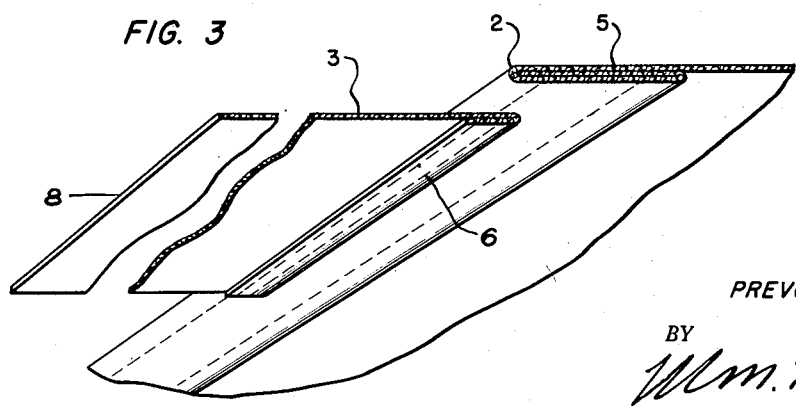
INVENTOR.
PREVOST F. SMITH
BY
*Wm. H. Dean*
AGENT Patented Dec. 22, 1953

2,663,524

UNITED STATES PATENT OFFICE 2,663,524
PARACHUTE FLAP

Prevost F. Smith, San Diego, Calif.

Application August 21, 1950, Serial No. 180,535

8 Claims. (Cl. 244—148)

My invention relates to a flap that momentarily covers the mouth of a parachute during deployment and initial opening for the dual purpose of preventing damage to the canopy and to delay the opening so that a conventional parachute can be useful at substantially higher speeds, and the objects of my invention are:

First, to provide a parachute flap which is particularly useful when used in conjunction with deployment bag method of deployment;

Second, to provide a flap of this class which prevents the inrush of air through the mouth of the parachute before the parachute is fully straightened out, whereby this blast of high speed air at the accordion folds of the vent area of the canopy is checked until said parachute is straightened out, preventing major deployment damage to the parachute;

Third, to provide a parachute flap of this class which prevents inrush of air, whereby the initial drag load is sharply reduced and the time of opening is desirably increased;

Fourth, to provide a parachute flap of this class in which flaps of fabric over the mouth of the parachute attain these desirable results in a simple and practical manner;

Fifth, to provide a parachute flap of this class which is very simple and economical of construction, efficient in operation, and which will not readily deteriorate or get out of order; and Sixth, to provide a parachute flap of this class which may be arranged in numerous ways in connection with the mouth of a parachute canopy.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a perspective view of the parachute as it is folded preparatory for packing; Fig. 2 is a perspective view of flaps folded in place over the mouth of the parachute; and Fig. 3 is a view of the attachment of the flap to the skirt of the parachute.

As shown in Fig. 1, two flaps 3 are sewed to the edge or skirt 2 of the canopy, which is comprised of stitched-together panels, and on either sides of the bottom suspension lines 4. Hence, the flaps are attached to contiguous panels of the canopy and when the parachute is folded the flaps appear as an extension of the part of panel to which the particular flap is secured. Figure 1 best illustrates this feature. As shown in Fig. 2, these flaps 3 are then folded over the mouth of the series of successive pleats 7 of the canopy 1. The parachute is then stowed in the deployment bag in the conventional manner with the accordion type folds. When the parachute is deployed, the only air that can get into the canopy is in the small suspension line area between the flaps 3. Thus, a premature major blast of air through the canopy is prevented. The flaps 3 preferably have one edge rolled along its width and sewed with stitching 6 to the skirt which has a reinforcement tape 5. The free end 8 of the flap 3 is preferably a selvage edge to prevent ravelling. It will be noted that the length of the flaps 3 are a fraction of the diameter of the parachute canopy at the skirt.

The parachute will positively open due to the air entering the canopy through the suspension line area between the flaps and filling the canopy to the extent that the mouth of the parachute expands beyond the coverage of the flaps.

It is anticipated that the time delay in opening can be controlled by using flaps of different sizes and shapes to suit the individual requirements. For example, large flaps shaped to lay over each other on top of the pleats would be most suitable for extra high speeds because this would further delay the final opening of the parachute. However, this would cause a perhaps undesirable delay at low speeds, so that a compromise in the size and shape of the flaps would have to be made if it was determined that a low speed quick opening was also essential.

While I have shown and described one form of my invention, there are several possible arrangements that would fall within the scope of my invention, so I do not wish to be limited to this particular construction, combination and arrangement, but desire to include in the scope of my invention the arrangement substantially as set forth in the appended claims.

Having thus described my invention, what I claim as new and desire to secure by Letters Patent is:

1. A parachute comprising a series of panels folded to form successive pleats, a flap of fabric slightly less in width than and attached to the skirt of one panel of said parachute and being of a length fractional to the diameter of said parachute, the parachute to be packed and deployed with said flap covering the successive pleats of said parachute to reduce the amount of air that can initially enter the canopy through the mouth of said parachute.

2. A parachute comprising a series of panels folded to form successive pleats, two flaps of fabric slightly less in width than and individually attached to the skirts of adjacent panels so that as the parachute is packed and deployed said flaps cover the successive pleats of said parachute to reduce the amount of air than can initially enter the canopy through the mouth of said canopy, and said flaps being of a length fractional to the diameter of said parachute.

3. A parachute comprising a series of panels folded to form successive pleats, two flaps of fabric individually attached to the skirts of opposite panels so that as the parachute is packed and deployed said flaps cover the successive pleats of said parachute to reduce the amount of air that can initially enter the canopy through the mouth of said canopy, and said flaps being of a length fractional to the diameter of said parachute.

4. A parachute having a canopy provided with a peripheral skirt portion, flap means secured to said skirt portion and extendable over opposite portions of said skirt portion when said parachute is folded in packed position, and said flap means being of a length fractional to the diameter of said parachute.

5. A parachute arranged in folded pleated position, flexible flap means secured to the peripheral skirt thereof and over the pleated folded mouth of the parachute canopy, adapted to check the passage of air into the mouth of the parachute when deployed, permitting the parachute to become straightened out before receiving a large volume of high speed air through the mouth thereof, and said flap means being of a length fractional to the diameter of said parachute.

6. A parachute arranged in folded pleated position, having suspension lines arranged at the middle thereof, and a pair of flexible flaps secured to the peripheral skirt of said parachute on one side thereof and folded over the open ends of said pleats at the mouth of the parachute to the opposite side of the folded structure of said parachute.

7. A parachute arranged in folded pleated position, having suspension lines arranged at the middle thereof, and a flexible flap secured by one edge to one side the peripheral skirt of said parachute and folded over the open ends of said pleats at the mouth of said parachute to the opposite side of the folded structure of said parachute.

8. A parachute arranged in folded pleated position, having suspension lines arranged at the middle thereof, flexible flaps individually secured by one edge to the peripheral skirt of said parachute on one side thereof and folded over the open ends of said pleats at the mouth of said parachute to the opposite side of the folded structure of said parachute, and the length of said flap means being fractional to the diameter of said parachute.

PREVOST F. SMITH.

References Cited in the file of this patent

UNITED STATES PATENTS

| Number | Name | Date |
| --- | --- | --- |
| 1,685,422 | Hurlburt | Sept. 25, 1928 |
| 2,337,168 | Smith | Dec. 21, 1943 |
| 2,386,829 | Wilson | Oct. 16, 1945 |